United States Patent
Stoppel et al.

(10) Patent No.: US 11,680,632 B2
(45) Date of Patent: Jun. 20, 2023

(54) GEAR RING CARRIER PART FOR A TWO- OR MULTI-COMPONENT GEAR AND TWO- OR MULTI-COMPONENT GEAR WITH SUCH A GEAR RING CARRIER PART

(71) Applicant: IMS GEAR SE & Co. KGaA, Donaueschingen (DE)

(72) Inventors: Eugen Stoppel, Muehlingen (DE); Sebastian Birk, Trossingen (DE); Egor Melnikov, Wurmlingen (DE); Stephan Oberle, Villingen-Schwenningen (DE)

(73) Assignee: IMS GEAR SE & CO. KGAA, Donaueschingen (DE)

( * ) Notice: Subject to any disclaimer, the term of this patent is extended or adjusted under 35 U.S.C. 154(b) by 160 days.

(21) Appl. No.: 17/038,343

(22) Filed: Sep. 30, 2020

(65) Prior Publication Data
US 2021/0095751 A1    Apr. 1, 2021

(30) Foreign Application Priority Data
Oct. 1, 2019   (EP) ..................... 19200799

(51) Int. Cl.
*F16H 55/17*    (2006.01)
(52) U.S. Cl.
CPC .................... *F16H 55/17* (2013.01)
(58) Field of Classification Search
CPC .......... F16H 55/17; F16H 1/003; F16H 1/227; F16H 3/00; F16H 27/08
See application file for complete search history.

(56) References Cited

U.S. PATENT DOCUMENTS

2007/0087617 A1* 4/2007 Oberle .................... F16H 55/06
439/395
2010/0201030 A1* 8/2010 Oberle .................... F16H 55/06
264/262

(Continued)

FOREIGN PATENT DOCUMENTS

DE   102012102776 A1   10/2013
EP      2899430 A1    7/2015

(Continued)

OTHER PUBLICATIONS

European Search Report dated Feb. 17, 2020, for corresponding EP application No. 19200799.5.

(Continued)

*Primary Examiner* — Zakaria Elahmadi
(74) *Attorney, Agent, or Firm* — Nath, Goldberg & Meyer; Jerald L. Meyer

(57) ABSTRACT

The present invention relates to a gear ring carrier part (10) for a two- or multi-component gear (11), the gear ring carrier part (10) having a circular ring section (12) rotating in the circumferential direction about an axis of rotation (A), a gear ring (14) arranged radially on the outside of the circular ring section (12), and an extension (16) extending radially inward from the circular ring section (12), the extension (16) having a first extension face (30) and a second extension face (32), a number of first ribs (34) and an equal number of first pockets (36) being arranged on the first extension face (30), and/or a number of second ribs (38) and an equal number of second pockets (40) being arranged on the second extension face (30), the first ribs (34) and the first pockets (36) and/or the second ribs (38) and the second pockets (40) each extending radially and being arranged adjacent to one another in the circumferential direction. The invention also (Continued)

relates to a two-component or multi-component gear (11) with such a gear ring carrier part (10).

17 Claims, 10 Drawing Sheets

(56) References Cited

U.S. PATENT DOCUMENTS

| | | | | |
|---|---|---|---|---|
| 2011/0011195 | A1* | 1/2011 | Oberle | B29C 45/0055 |
| | | | | 74/434 |
| 2013/0228028 | A1* | 9/2013 | Kim | B29C 45/1671 |
| | | | | 264/279 |
| 2014/0007724 | A1* | 1/2014 | Kim | B29C 45/1671 |
| | | | | 264/328.12 |
| 2017/0057539 | A1* | 3/2017 | Kim | F16H 57/039 |
| 2017/0166239 | A1* | 6/2017 | Kim | F16H 55/06 |
| 2018/0017149 | A1* | 1/2018 | Takeuchi | B62D 5/0454 |

FOREIGN PATENT DOCUMENTS

| | | |
|---|---|---|
| EP | 3459706 A1 | 3/2019 |
| JP | 5775940 B2 | 9/2015 |
| KR | 10-2019-0035586 A | 4/2019 |
| WO | 2019/121781 A1 | 6/2019 |
| WO | WO-2019121781 A1 *  6/2019 ....... B29C 45/14491 |

OTHER PUBLICATIONS

Office Action dated Mar. 16, 2022, in corresponding Korean application No. 10-2020-0119723.

* cited by examiner

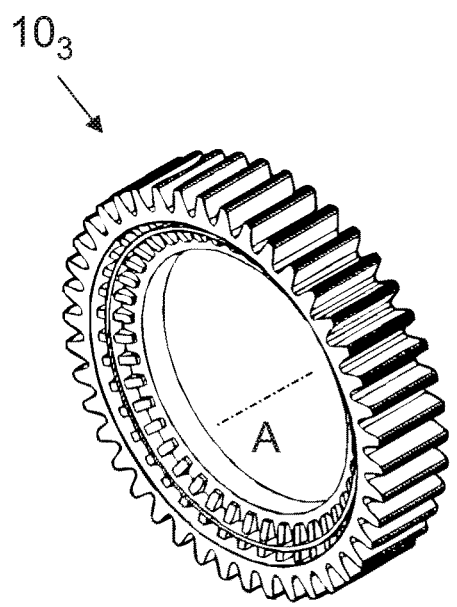
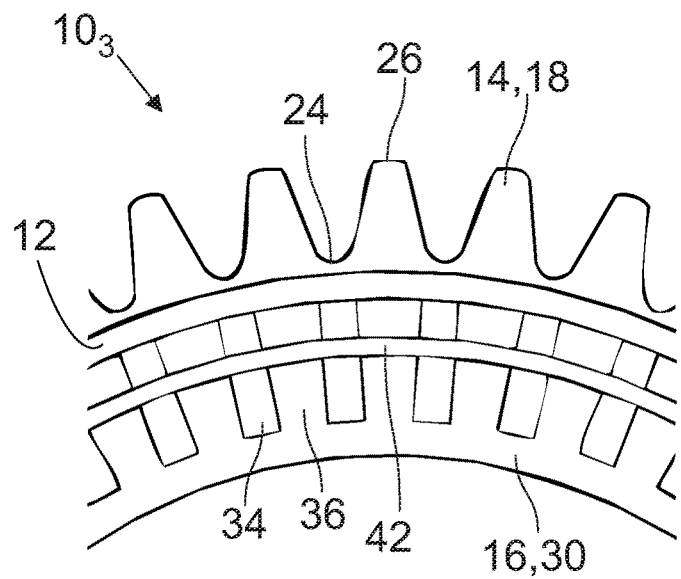
Fig.3A                Fig.3B
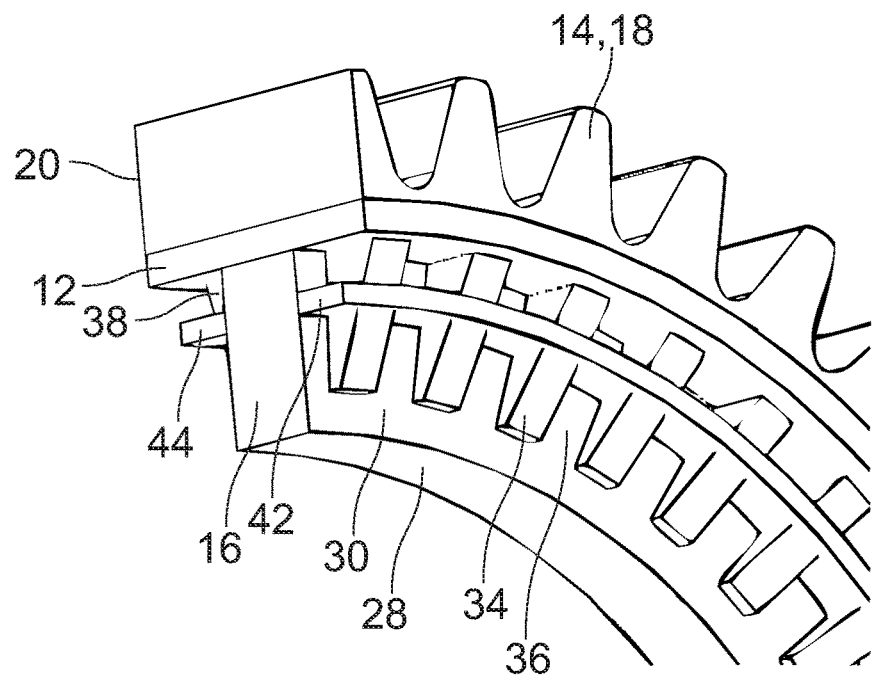
Fig.3C

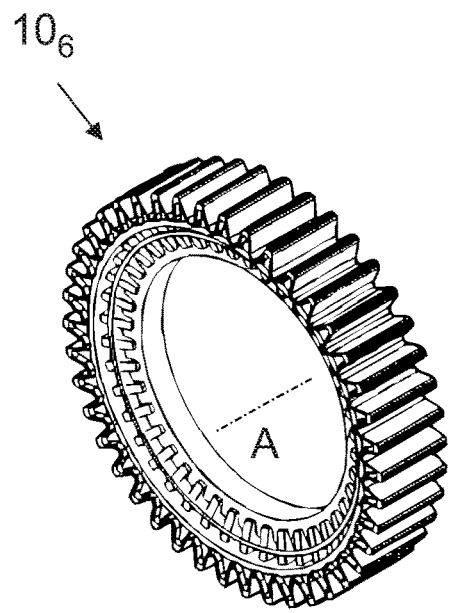
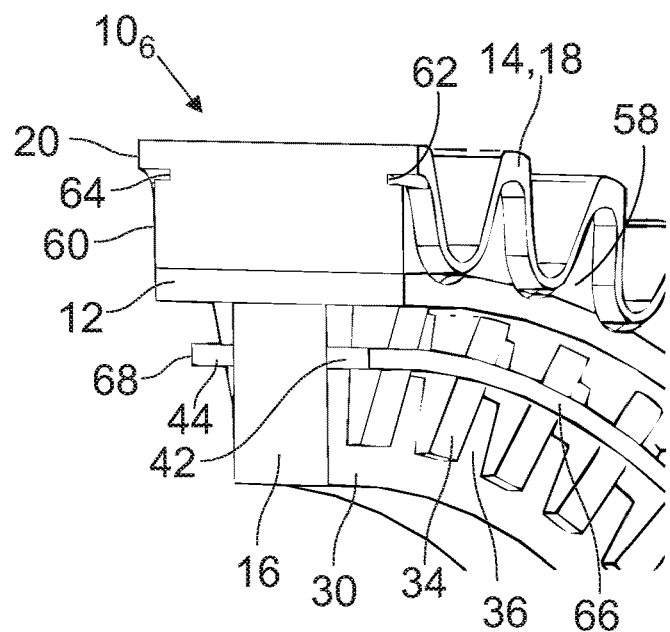
Fig.6A   Fig.6B
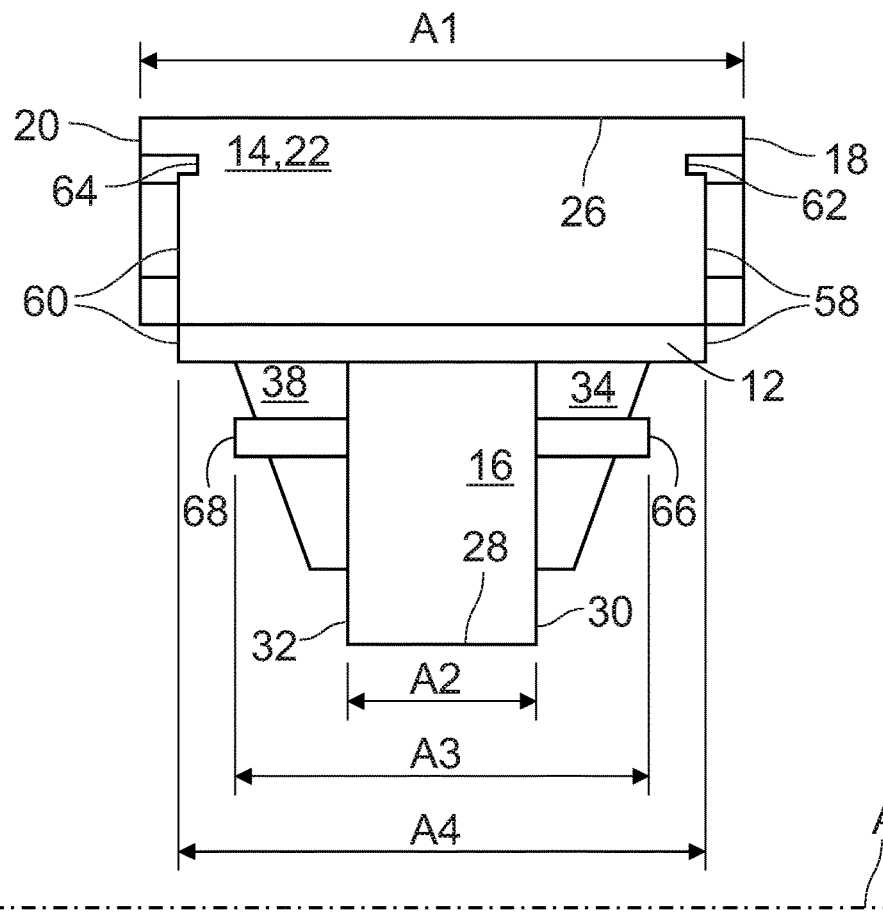
Fig.6C

GEAR RING CARRIER PART FOR A TWO- OR MULTI-COMPONENT GEAR AND TWO- OR MULTI-COMPONENT GEAR WITH SUCH A GEAR RING CARRIER PART

CROSS-REFERENCE TO RELATED APPLICATIONS

Field

The present invention relates to a gear ring carrier part for a two- or multi-component gear. The invention also relates to a two- or multi-component gear with such a gear ring carrier part.

BACKGROUND

Multi-component gears are disclosed, for example, in EP 2 899 430 A1 and are characterized in that they are made up of at least two different materials. For example, the gear ring carrier part which forms the gear ring can be made of a first material, while the rest of the gear consists of a second material. One of the advantages of this configuration of two- or multi-component gears is that the material can be selected in accordance with the loads prevailing at the location of the gear. The gear ring carrier part with the gear ring is exposed to high wear and/or high forces, while the part connected to the gear ring carrier part, hereinafter referred to as the connecting part, is typically subjected to high torsional and tilting torques that must be absorbed. A two-component gear can therefore consist of a first plastic and a second plastic, for example, the first plastic being used for the gear ring carrier part and the second plastic being used for the connecting part. A particularly wear-resistant plastic can be selected for the first plastic, while the second plastic can be a self-reinforcing plastic, which can also be fiber-reinforced.

In the case of three-component gears, for example, the hub can be formed by an insert part that can be made of metal.

In the case of two- or multi-component gears it must be ensured that the gear ring carrier part and the connecting part cannot become detached from one another, not even in partial areas, and that they cannot slip against one another even at high torques. If the gear has an insert part, this must not detach from the connecting part or slip relative to the connecting part. The consequence of such a detachment is high deformations, which result in poorer running behavior of the gearing. This also causes increased tooth base tensions, incorrect engagement, increased noise generation during operation and premature damage and failures.

It is therefore known from US 2014/007724 A1, for example, to provide the gear ring carrier part and the insert part with projections and recesses with which the connecting part interacts in a form-fitting manner in the circumferential direction, which can counteract slippage.

Two- or multi-component gears are increasingly being manufactured by injection molding, which is particularly the case when the two- or multi-component gears are made entirely or partially of plastic. In US 2014/007724 A1 two frequently used injection molding processes are shown, namely on the one hand the cone gate method and on the other hand the pinpoint gate method. With these two processes, the gear ring carrier part can be molded. Due to the projections and recesses of the gear ring carrier part, the flow path of the material used that is liquid when injected into the injection mold is unfavorable insofar as the material reaches some points within the injection mold significantly later than neighboring points. As a result, overflow channels form and the material cools down later than at the neighboring points. The finished gear ring carrier part therefore has inhomogeneities, weld seams, air pockets and burns, as a result of which the maximum load capacity of gears having such gear ring carrier parts is limited. Furthermore, due to the non-optimal flow paths, high loads on the material occur. In order to still achieve an acceptable part quality, excessively high holding pressures are used, with the result that the material and the mold are excessively stressed and injection molds and machines have to be designed or selected to be correspondingly larger.

In order to still be able to increase the maximum load capacity of injection-molded two- or multi-component gears to the desired level, the wall thicknesses of the gear ring carrier part are selected to be correspondingly large, but this leads to increased material consumption and long process cycle times. In addition, the injection molds used for the gating must also be designed to be larger and with correspondingly large wall thicknesses, even though these wall thicknesses are not required for the actual function. The volume to be removed after the gating has taken place increases accordingly.

Attempts are also made to improve the flow behavior by increasing the temperature of the injection mold, but this leads to increased energy consumption and increased thermal stress on the injection mold.

SUMMARY

The object of an embodiment of the present invention is to provide a gear ring carrier part which can be manufactured in such a way that it has fewer inhomogeneities and can therefore be subjected to higher loads than known and comparable gear ring carrier parts. Furthermore, an embodiment of the present invention is based on the object of creating a two- or multi-component gear which has a gear ring carrier part that can be subjected to higher loads.

One embodiment of the invention relates to the gear ring carrier part for a two- or multi-component gear,
the gear ring carrier part having
a circular ring section rotating in the circumferential direction about an axis of rotation,
a gear ring arranged radially on the outside of the circular ring section,
an extension extending radially inward from the circular ring section, and
the extension
having a first extension face and a second extension face,
a number of first ribs and an equal number of first pockets being arranged on the first extension face, and/or
a number of second ribs and an equal number of second pockets being arranged on the second extension face,
the first ribs and the first pockets and/or the second ribs and the second pockets each extending radially and being arranged adjacent to one another in the circumferential direction.

The gear ring carrier part can be subdivided into the circular ring section and the extension, these being materially connected. In this respect, this subdivision is to be seen mainly conceptually. The gear ring extends radially outward from the circular ring section. The extension starts from the circular ring section and extends radially inward toward the axis of rotation. The extension forms the first extension face and the second extension face. The first ribs and the first pockets are arranged on the first extension face and the second ribs and the second pockets are arranged on the second extension face. Since the extension, the ribs and the pockets are materially connected here as well, the surfaces of the ribs and the pockets form part of the extension faces.

The ribs and the pockets are aligned radially, that is, they run from the axis of rotation toward the gear ring carrier part. In the finished two- or multi-component gear, the radially running ribs and pockets provide a form fit acting in the circumferential direction between the gear ring carrier part and the component of the two- or multi-component gear wheel connected to the gear ring carrier part, so that the torques transmittable between the gear ring carrier part and the component connected to it are increased compared to known two- or multi-component gears.

Due to the proposed design of the extension, a flow path for the material that is liquid during injection results which leads to a significantly more uniform filling of the injection mold than is the case with gear ring carrier parts known, for example, from US 2014/007724 A1. Consequently, the formation of overflow channels is reduced and the homogeneity of the proposed gear ring carrier part is increased. The load-bearing capacity of the proposed gear ring carrier part is increased compared to known, comparable gear ring carrier parts.

According to a further embodiment, the first ribs and the first pockets and/or the second ribs and the second pockets each form an undulating transition with the circular ring section. The undulating transition should be understood to mean a continuous transition without steps, edges or narrow radii. This undulating transition favors the flow path of the liquid material during injection, in particular the plastic used, so that the formation of the above-mentioned inhomogeneities, weld seams, air pockets and burns is avoided or at least significantly reduced. In addition, the formation of stress peaks is avoided.

In a further developed embodiment, a number of teeth can be arranged on the gear ring which is equal to the number of the first and second ribs and the number of the first pockets and second pockets. If you mentally combine a rib and a pocket to form a driving unit, there is one driving unit per tooth. Alternatively, the number of teeth can be a multiple, in particular an integer multiple, and, for example, twice or three times as high as the number of the first and second ribs and the number of first pockets and second pockets. However, the number of teeth can also be less than the number of the first and second ribs and the number of first pockets and second pockets, for example half or a quarter.

It has been found that, in this embodiment, the force and tension curve within the gear ring carrier part is particularly favorable, so that the forces and torques that can be transmitted can be increased compared to known, comparable gear ring carrier parts.

In a further developed embodiment,
each tooth of the gear ring can form a corresponding tooth base and a corresponding tooth tip and
the first and second ribs can be in alignment with the tooth bases and the first and second pockets can be in alignment with the tooth tips, or
the first and second ribs can be in alignment with the tooth tips and the first and second pockets can be in alignment with the tooth bases.

In this embodiment, the force and tension curves within the gear ring carrier part can be increased further, so that the transmittable forces and torques can be increased again compared to known, comparable gear ring carrier parts.

In a further embodiment,
on the first extension face at least one annular first wall can be arranged, which divides the first ribs and the first pockets into a radially inner section and a radially outer section in each case and/or
on the second extension face at least one annular second wall can be arranged, which divides the second ribs and the second pockets into a radially inner section and a radially outer section in each case.

The annular first wall and the annular second wall are arranged substantially concentrically to the axis of rotation. In the completed two- or multi-component gear, the walls provide a form fit acting in the radial direction between the gear ring carrier part and the component of the two- or multi-component gear connected to the gear ring carrier part. Particularly when the gear ring is designed so that there is helical gearing, forces acting along the axis of rotation are also introduced into the gear ring by the gear with which the two- or multi-component gear is in meshing engagement. As a result, a torque is applied, which deforms the gear ring carrier part in such a way that it could become detached from the connected component. It is also possible that radial forces acting toward the axis of rotation are introduced into the gear ring carrier part via the meshing engagement. As a result, the gear ring carrier part is deformed from a circular shape to an elliptical shape, which could also lead to a detachment from the connected component.

The wall provides an undercut, so that there is a form fit acting in the radial direction between the gear ring carrier part and the connected component. This detachment is counteracted because of the form fit acting in the radial direction.

A further developed embodiment is characterized in that
the first wall has first recesses which are arranged in alignment with the first pockets and/or
the second wall has second recesses which are arranged in alignment with the first pockets.

In this embodiment, the wall roughly follows the shape of the ribs and pockets. In other words, in this embodiment the height of the wall starting from the ribs and the pockets is kept approximately constant toward the free end of the wall. The formation of weld seams is reduced, which has a positive effect on the load-bearing capacity of the gear ring carrier part.

According to a further embodiment,
the gear ring has a first gear ring face and a second gear ring face, which are arranged at a first distance from one another, and
the first extension face and the second extension face are arranged at a second distance from one another,
the ratio being $1<A1/A<10$, in particular $2<A1/A2<5$.

The second distance must be smaller than the first distance, so that the component connected to the gear ring carrier part can enclose the extension in the finished state of the two- or multi-component gear. In this respect, it must be ensured that the ratio of the first distance $A1$ to the second distance $A2$ is greater than 1. However, in order to be able to provide a sufficient geometrical moment of inertia and consequently sufficient stability against deformation as a result of axially and radially acting forces, the first distance should not be too much larger than the second distance.

According to a further embodiment,
the first recesses have a first recess face and
the second recesses have a second recess face, wherein
the first recess face and the second recess face are spaced apart from one another by a fifth distance $A5$, wherein $A5 \geq A2$.

As mentioned, the recesses ensure that the wall roughly follows the shape of the ribs and pockets. With the specified ratio of A5≥A2, the formation of weld seams is particularly effectively reduced, which has a positive effect on the load-bearing capacity of the gear ring carrier part.

In a further developed embodiment, the first pockets in the radially outer section have a first pocket base surface and the second pockets in the radially outer section have a second pocket base surface, which are arranged at a sixth distance A6 from one another, wherein A2≥A6.

In this embodiment, the pockets in the radially outer section protrude particularly deep into the extension, so that a particularly large volume is available for the aforementioned form fit with the connecting part, which acts in the circumferential direction, so that in this embodiment large torques between the gear ring carrier part and the connecting part can be transmitted.

According to a further embodiment, the first pockets in the inner outer section have a first inner pocket base surface and the second pockets in the radially inner section have a second inner pocket base surface, which are arranged at a seventh distance from one another, where A2≥A7.

As mentioned in the beginning, it is advisable to manufacture the gear using the cone gate method. The extension is directly related to the gate cone, so that in this embodiment the distance A7 substantially corresponds to the thickness of the gate cone. Because A7 is less than or equal to A2, the mass of the extension can be kept low. Because the protruding part of the material in the cone gate has to be removed mechanically after the injection molding process, waste is reduced, which in this embodiment is particularly extensive. The protruding part of the cone gate is usually twisted off. If A7 is chosen to be particularly low, a more cost-effective removal process, for example punching, can be used. In addition, with a low A7, the cycle time of the manufacturing process can be reduced, since the gear ring carrier part can cool down faster and more evenly.

Another embodiment is characterized in that
the gear ring has a base diameter and
the extension has an inner surface that faces the axis of rotation and has an inner surface diameter,
wherein the ratio of base diameter to inner surface diameter Df/Di is greater than 1.

The ratio of the base diameter to the inner surface diameter Df/Di can in particular be increased with a reduction in the inner surface diameter Di. The further the extension extends from the circular ring section toward the axis of rotation, the smaller the inner surface diameter Di and the greater the ratio of base diameter to inner surface diameter Df/Di. With an increasing ratio of base diameter to inner surface diameter Df/Di, the geometrical moment of inertia and consequently sufficient stability against deformation are increased as a result of axially and radially acting forces.

According to a further embodiment,
the circular ring section has a first circular ring section face and a second circular ring section face, wherein
at least one first circular ring section pocket is arranged on the first circular ring section face, and/or
at least one second circular ring section pocket is arranged on the second circular ring section face.

The first circular ring section pocket and the second circular ring section pocket do not necessarily have to be continuous and completely circumferential. A plurality of first circular ring section pockets and a plurality of second circular ring section pockets can also be provided. Instead of the first circular ring section pockets and/or the second circular ring section pockets, first circular ring section projections and second circular ring section projections can also be provided.

In this embodiment, an undercut acting in the radial direction is produced radially on the outside, which counteracts the detachment in a particularly effective way when the two- or multi-component gear is completed.

According to a further developed embodiment, the first circular ring section pocket and/or the second circular ring section pocket are ring-shaped and have a constant diameter or an undulating course. In the case of the ring-shaped configuration, the molding tool is somewhat easier to manufacture, while in the case of the undulating course, the undercut also acts partially in the circumferential direction.

In a further developed embodiment, the first circular ring section pocket has an undulating course and runs at least in sections in the first gear ring face and/or the second circular ring section pocket has an undulating course and runs at least in sections in the second gear ring face. In this embodiment, the first circular ring section pocket and/or the second circular ring section pocket can be placed very far radially outward into the teeth, so that detachment can be counteracted particularly effectively when the two- or multi-component gear is completed.

According to a further developed embodiment, the first wall and the second wall are arranged at a third distance from one another and the first circular ring section face and the second circular ring section face are arranged at a fourth distance from one another, the first distance being greater than the third distance and/or the fourth distance being greater than the second distance. In this embodiment, the finished two- or multi-component gear is particularly stiff, so that deformations during operation can be kept low. Accordingly, slip and detachment can be effectively countered.

One embodiment of the invention relates to a two- or multi-component gear, comprising
a gear ring carrier part according to one of the previous embodiments, and
a connecting part connected to the gear ring carrier part in a form-fitting manner, wherein the connecting part
encloses the extension or
encloses the extension and the circular ring section, or
encloses the extension and the circular ring section and the gear ring in the area of the first circular ring section face and the second circular ring section face as well as the first circular ring section pocket and the second circular ring section pocket.

The technical effects and advantages that can be achieved with the proposed two- or multi-component gear correspond to those that have been discussed for the present gear ring carrier part. In summary, it should be pointed out that, due to the proposed design of the extension, a flow path for the material that is liquid during injection results which leads to a significantly more uniform filling of the injection mold than is the case with gear ring carrier parts known, for example, from US 2014/007724 A1. Consequently, the formation of overflow channels is reduced and the homogeneity of the proposed gear ring carrier part is increased. In addition, the radially aligned ribs and pockets of the gear ring carrier part form a form fit with the connecting part, which acts in the circumferential direction, so that the torque that can be transmitted between the gear ring carrier part and the connecting part is increased compared to known two- or multi-component gears.

These technical effects and advantages come into play especially when the gear ring carrier part is made from a first plastic and the connecting part is made from a second plastic. The first plastic can be a high-performance thermoplastic or an engineering thermoplastic, while the second plastic can be a high-performance thermoplastic, an engineering thermoplastic or a thermosetting plastic. It is advisable to produce the second plastic, from which the connecting part is made, in a fiber-reinforced way in order to achieve a particularly high axial rigidity, which is particularly desirable in the case of helical gearings.

In particular, when the connecting part encloses the extension and the circular ring section, the connecting part can enclose the gear ring carrier part very extensively in the radial direction. This allows deformations to be kept particularly low during operation. Accordingly, slip and detachment can be effectively countered. For this purpose, it is particularly favorable if the connecting part encloses the extension and the circular ring section in the area of the first circular ring section face and the second circular ring section face as well as the first circular ring section pocket and the second circular ring section pocket A further developed embodiment is characterized in that the two- or multi-component gear is designed as a spur gear, as a helical gear or as a worm gear.

If the two- or multi-component gear is designed as a spur gear, it can be used in many applications, in particular in spur gear units, which are widely used. The design of the proposed two- or multi-component gear is not limited to a spur gear, however. The proposed two- or multi-component gear can also be designed as a helical gear or worm gear, so that this can be used in helical gear units or worm gear units. Helical gear units and worm gear units are used, for example, in electromechanical drives for steering systems (EPS, electric power steering).

According to a further developed embodiment, the two- or multi-component gear wheel comprises an insert part, which is connected to the connecting part and is enclosed by the connecting part. The insert part can be used to form a shaft/hub connection. While the gear ring carrier part and the connecting part can be produced of a first plastic or a second plastic, as mentioned, it is advisable to produce the insert part from metal in order to form a highly resilient shaft-hub connection. The insert part can be a shaft, a hub, a ball bearing or the like.

BRIEF DESCRIPTION OF THE DRAWINGS

Exemplary embodiments of the invention are explained in more detail below with reference to the accompanying drawings. In the drawings:

FIGS. 3A to 3C show various representations of a third exemplary embodiment of a gear ring carrier part according to the invention, FIGS. 6A to 6C show various representations of a sixth exemplary embodiment of a gear ring carrier part according to the invention.

DETAILED DESCRIPTION

Figure 1A:
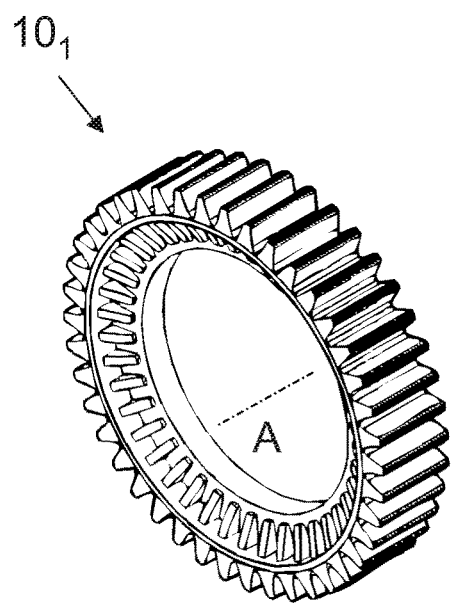
FIGS. 1A to 1C show various representations of a first exemplary embodiment of a gear ring carrier part according to the invention.
Figure 1B:
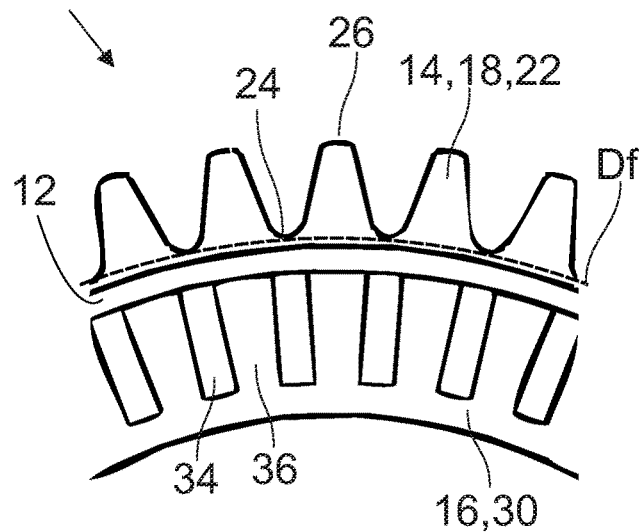
Figure 1C:
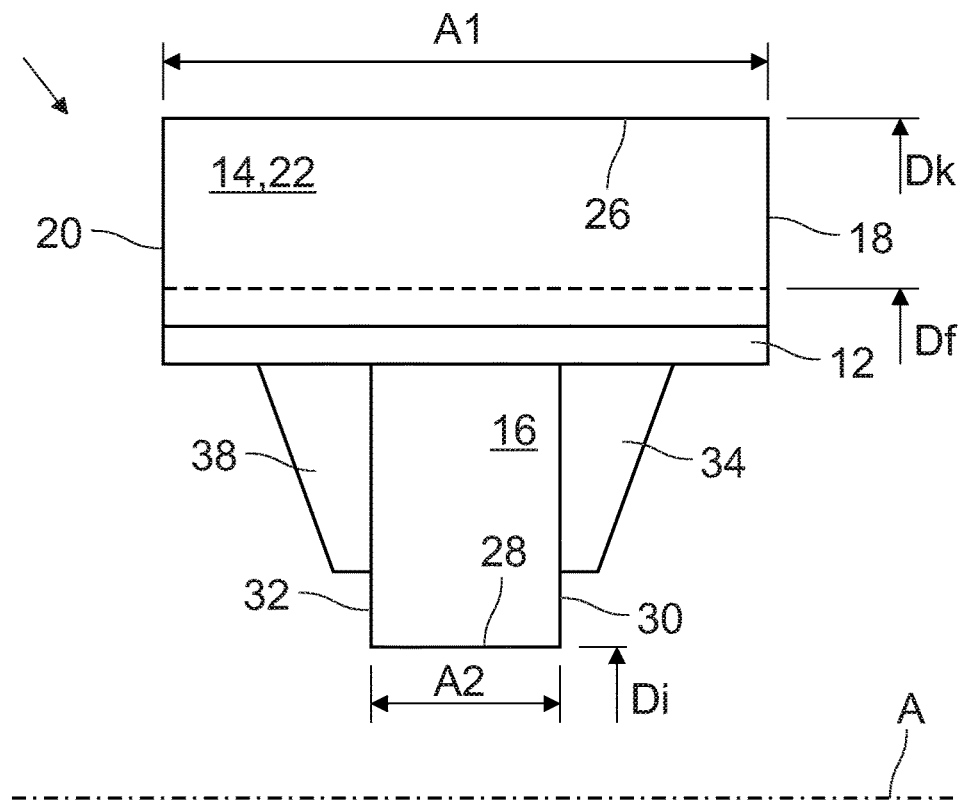
Figure 9:
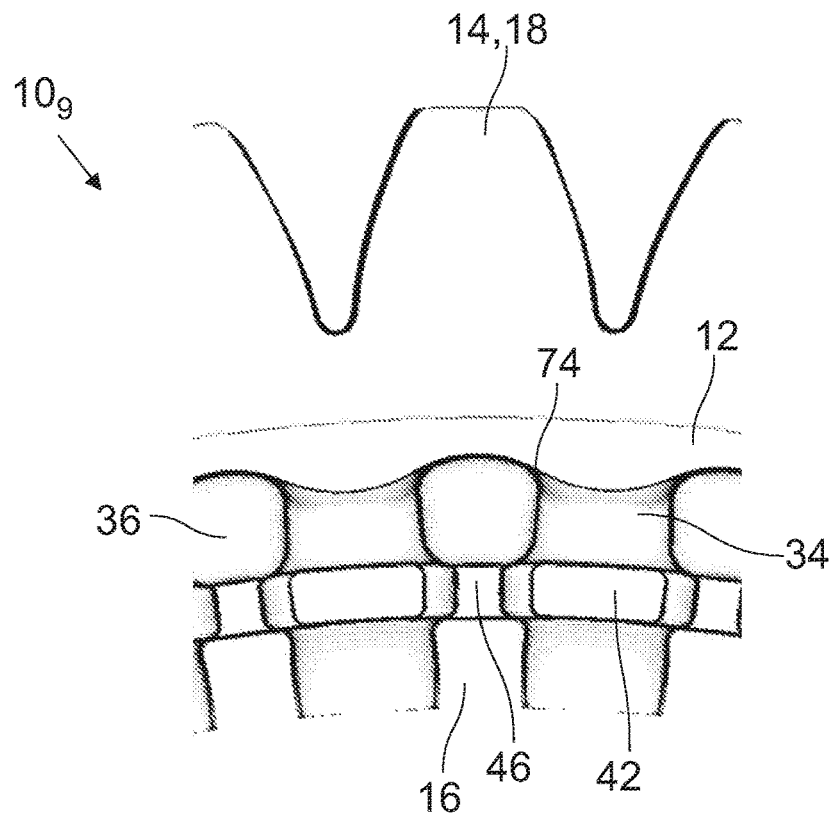
FIG. 9 shows a partial plan view of an eighth exemplary embodiment of a gear ring carrier part according to the invention.

FIGS. 1A to 1C show a first exemplary embodiment of a gear ring carrier part $10_1$ according to the invention, each using various representations, which can be used for a two-component gear (not shown) or a multi-component gear 11 (see FIG. 9). The two- or multi-component gear 11 is arranged concentrically to an axis of rotation A about which the two- or multi-component gear 11 can rotate. The sectional plane of the sectional view in FIG. 1C runs through the axis of rotation A.

The gear ring carrier part $10_1$ according to the invention, according to the first exemplary embodiment shown in FIGS. 1A to 1C, comprises a circular ring section 12 which runs in the circumferential direction in the shape of a ring around the axis of rotation A. Radially on the outside, the circular ring section 12 forms a gear ring 14 with which the gear ring carrier part $10_1$ or the two- or multi-component gear 11 provided with the gear ring carrier part $10_1$ can be brought into meshing engagement with a gear not shown here. Depending on the configuration, the two- or multi-component gear 11 can be designed as a spur gear 52 (see FIG. 9), helical gear or worm gear (not shown) and can be brought into engagement with a correspondingly designed gear.

The gear ring 14 has a first gear ring face 18 and a second gear ring face 20, which are arranged spaced apart from one another at a first distance A1 along the axis of rotation A (FIG. 1C). The gear ring 14 forms a number of teeth 22 which have a tooth base 24 and a tooth tip 26. At the tooth tip 26, the gear ring carrier part $10_1$ has a tip diameter Dk and at the tooth base 24 a base diameter Df.

The gear ring carrier part $10_1$ according to the invention furthermore has an extension 16 which, starting from the ring section 12, extends radially inward to the axis of rotation A and forms an inner surface 28 that faces the axis of rotation A. The inner surface 28 runs on an inner surface diameter Di about the axis of rotation A.

Furthermore, the extension 16 has a first extension face 30 and a second extension face 32, which are arranged at a second distance A2 along the axis of rotation A at a distance from one another.

Figure 2A:
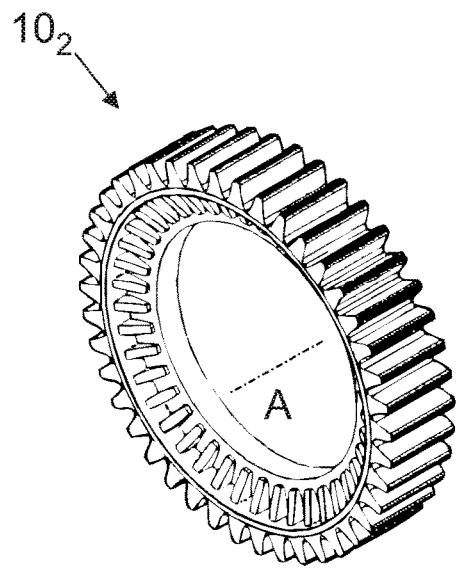
FIGS. 2A to 2F show various representations of a second exemplary embodiment of a gear ring carrier part according to the invention.
Figure 2B:
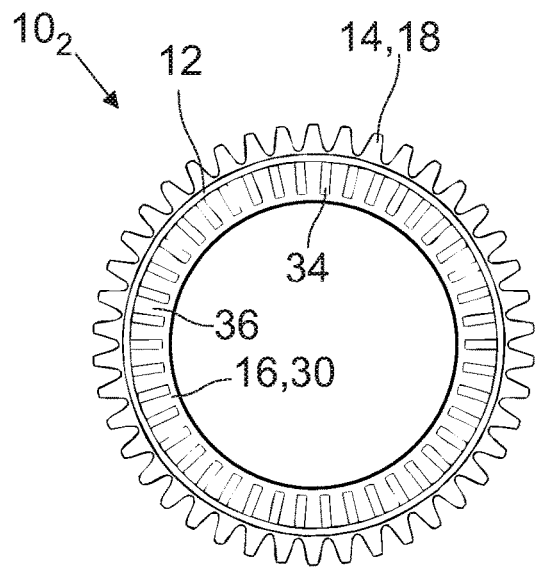
Figure 2C:
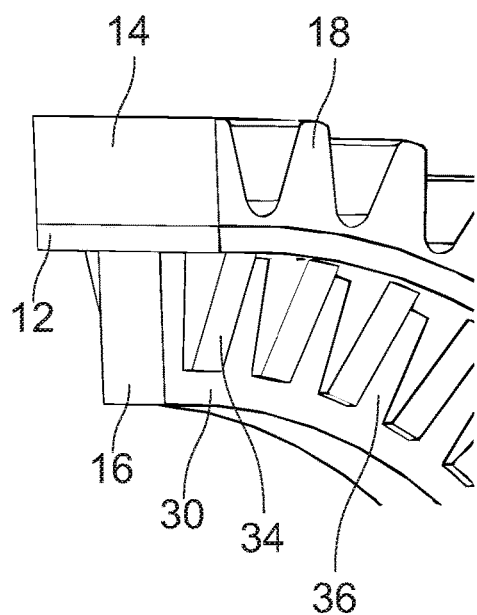
Figure 2D:
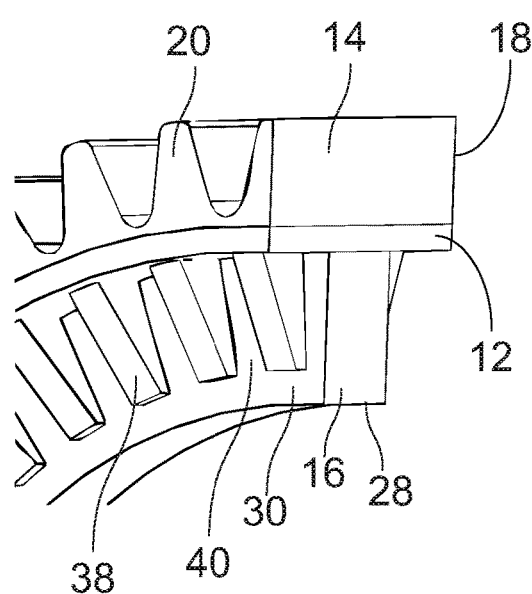
Figure 2E:
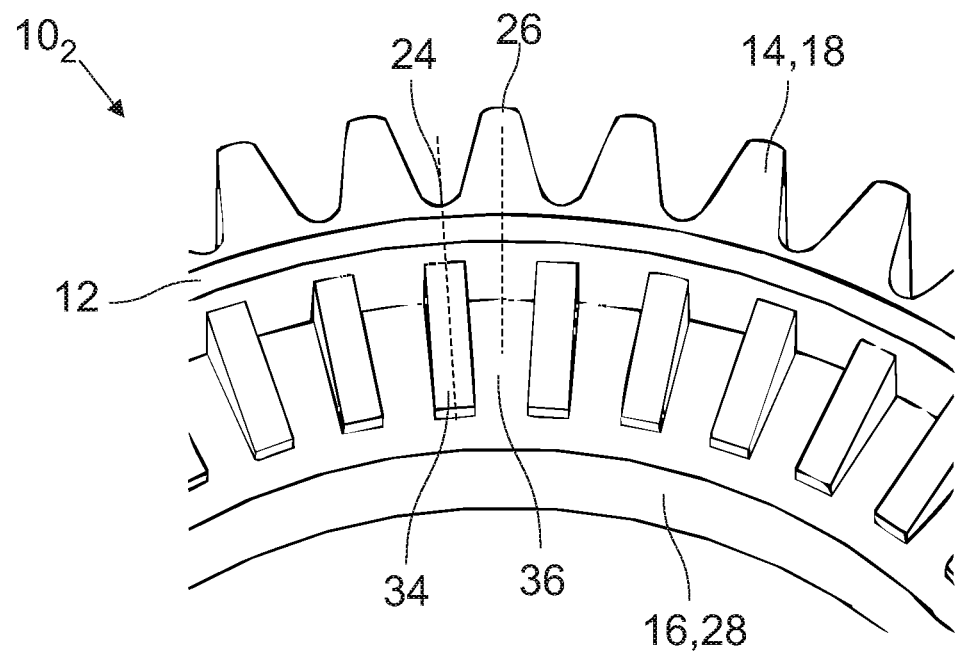
Figure 2F:
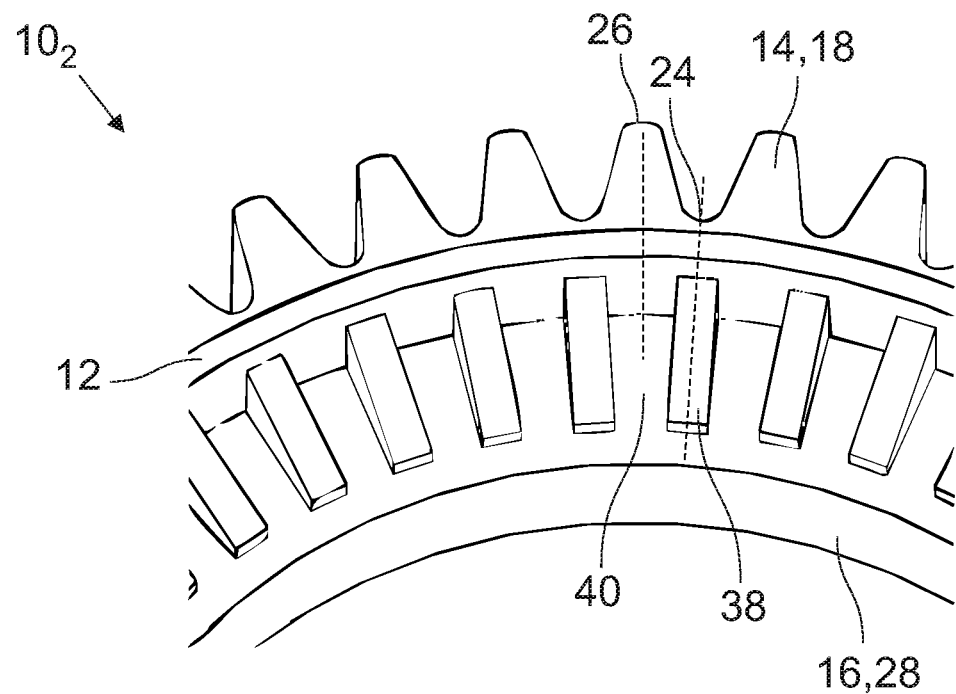

As can be seen particularly in FIGS. 1B and 1C, the gear ring carrier part $10_1$ comprises a number of first ribs 34 and first pockets 36, which are arranged on the first extension face 30 or form part of the first extension face 30. In addition, the gear ring carrier part $10_1$ comprises a number of second ribs 38 and second pockets 40, which are arranged on the second extension face 32 or form part of the second extension face 32 (see FIGS. 2C and 2D). The first ribs 34, the second ribs 38, the first pockets 36 and the second pockets 40 extend in the radial direction and are evenly distributed over the circumference of the gear ring carrier part. Viewed in the circumferential direction, a rib 34, 38 is arranged adjacent to a pocket 36, 40. The number of teeth 22 corresponds to the number of first ribs 34, first pockets 36, second ribs 38 and second pockets 40.

As mentioned, the first gear ring face 18 and the second gear ring face 20 are arranged at a first distance A1 from one another. The first extension face 30 and the second extension face 32 are arranged at a second distance A2 from one another. In the illustrated exemplary embodiments, the following relationship applies to the ratio A1/A2: 1<A1/A2<10, preferably 1<A1/A2<5.

As also mentioned, the gear ring 14 has a tip diameter Dk and a base diameter Df and the extension 16 has an inner surface 28 that faces the axis of rotation A and has an inner surface diameter Di. In the exemplary embodiments shown, the ratio Dk/Di is approximately 1.5. The ratio Df/Di is approximately 1.3.

FIGS. 2A to 2F show a second exemplary embodiment of the carrier part $10_2$ according to the invention with the aid of various exemplary embodiments. The carrier part $10_2$ according to the second exemplary embodiment is largely the same as the carrier part $10_1$ according to the first exemplary embodiment. As can be seen in particular from FIGS. 2E and 2F, the first ribs 34 and the second ribs 38 are aligned with the tooth bases 24. The first pockets 36 and the second pockets 40 are correspondingly aligned with the tooth tips 26. An embodiment in which the first ribs 34 and the second ribs 38 are aligned with the tooth tips 26 is not shown. In the case of helical gears, the first ribs 34 and the second ribs 38 are arranged rotated about the axis of rotation A depending on the helix angle. The same applies to the first pockets 36 and the second pockets 40.

In FIGS. 3A to 3C, a third exemplary embodiment of the carrier part $10_3$ according to the invention is shown with the aid of various representations. On the first extension face 30 an annular first wall 42 is arranged, which divides the first ribs 34 and the first pockets 36 into a radially inner section and a radially outer section in each case. On the second extension face 32 an annular second wall 44 is arranged, which divides the second ribs 38 and the second pockets 40 into a radially inner section and a radially outer section in each case.

Figure 4A:
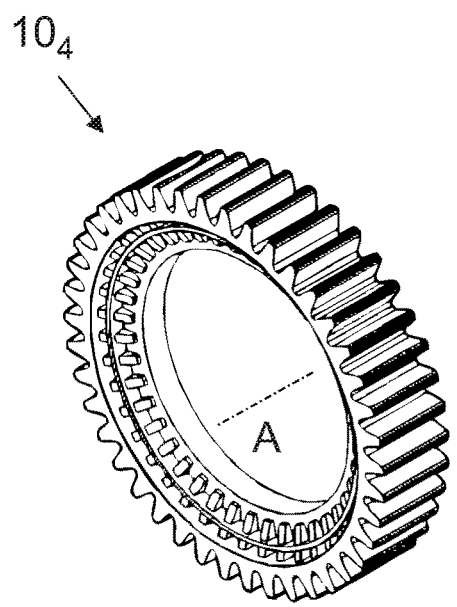
FIGS. 4A to 4C show various representations of a fourth exemplary embodiment of a gear ring carrier part according to the invention.
Figure 4B:
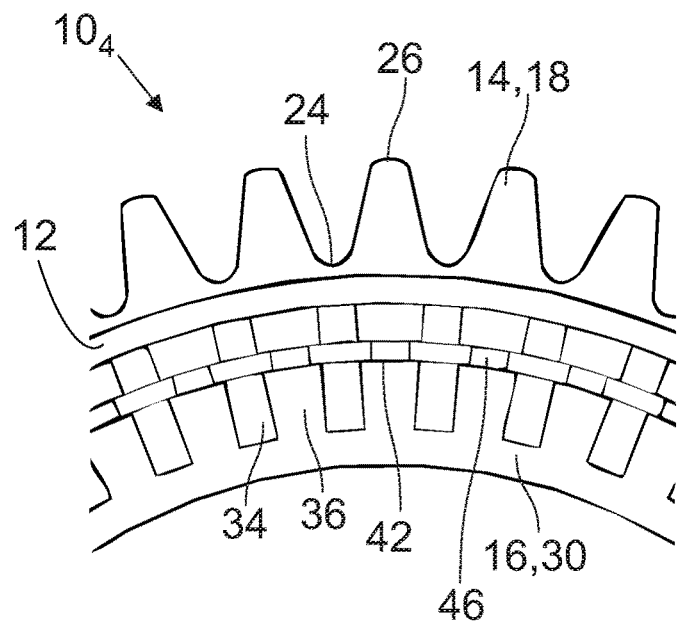
Figure 4C:
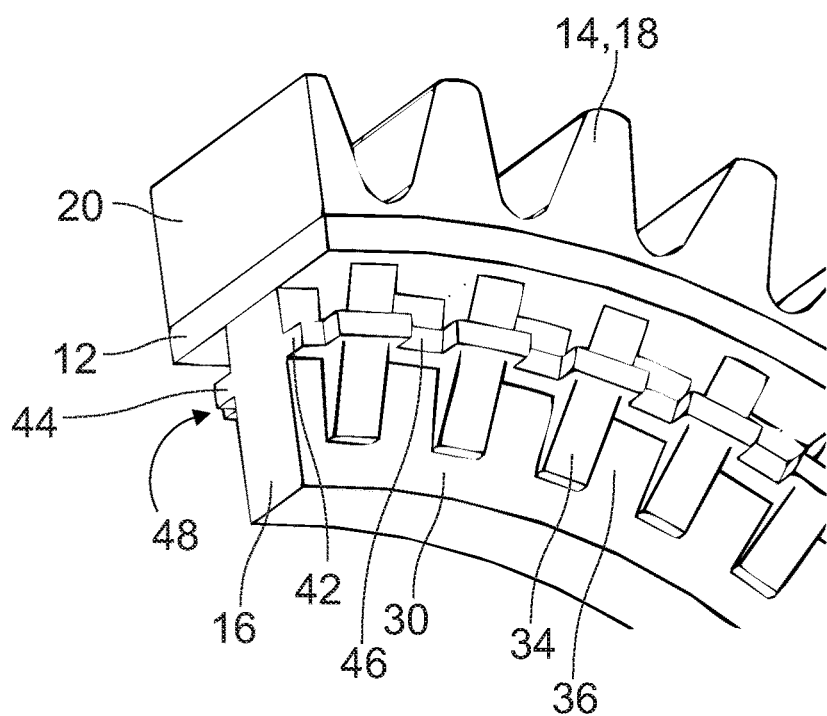

In FIGS. 4A to 4C, a fourth exemplary embodiment of the carrier part $10_4$ according to the invention is shown with the aid of various representations. In the fourth exemplary embodiment of the carrier part $10_4$ according to the invention, the first wall 42 has first recesses 46 and the second wall 44 has second recesses 48, which are arranged in alignment with the first pockets 36 and with the second pockets 40, respectively. The walls 42, 44 thus roughly follow the ribs 34, 38 and the pockets 36, 40.

As can be seen in particular from FIGS. 3B and 4B, in the third and fourth exemplary embodiments of the carrier part $10_3$, $10_4$ according to the invention, the pockets 36, 40 are aligned with the tooth tips 26 of the respective teeth 22 when viewed in the radial direction.

Figure 5A:
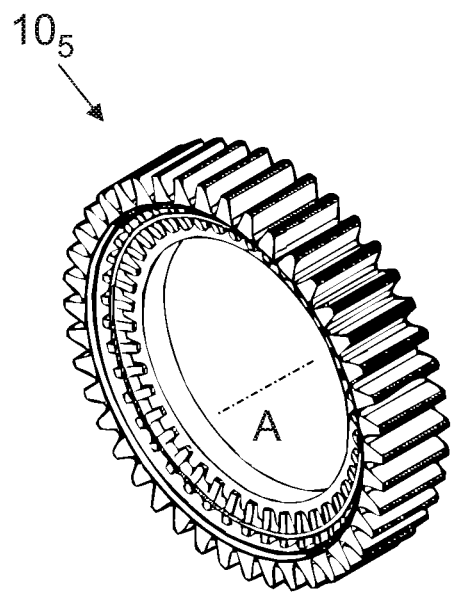
FIGS. 5A to 5C show various representations of a fifth exemplary embodiment of a gear ring carrier part according to the invention.
Figure 5B:
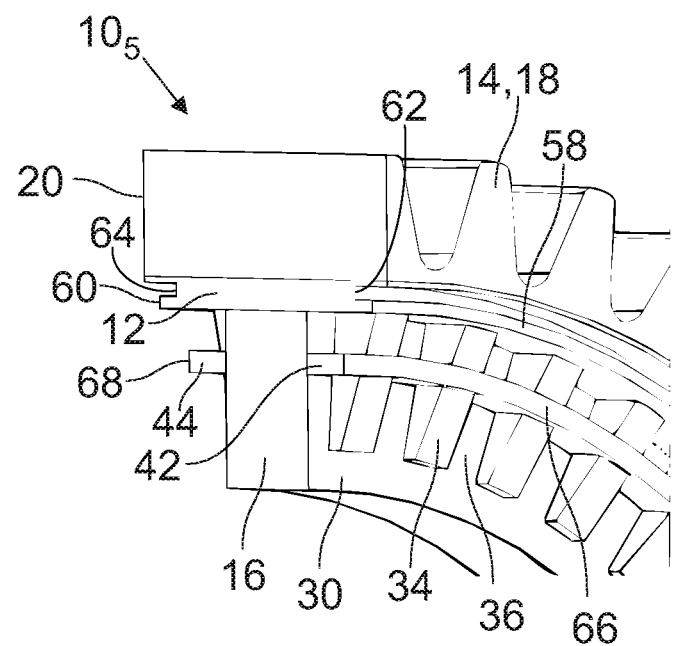
Figure 5C:
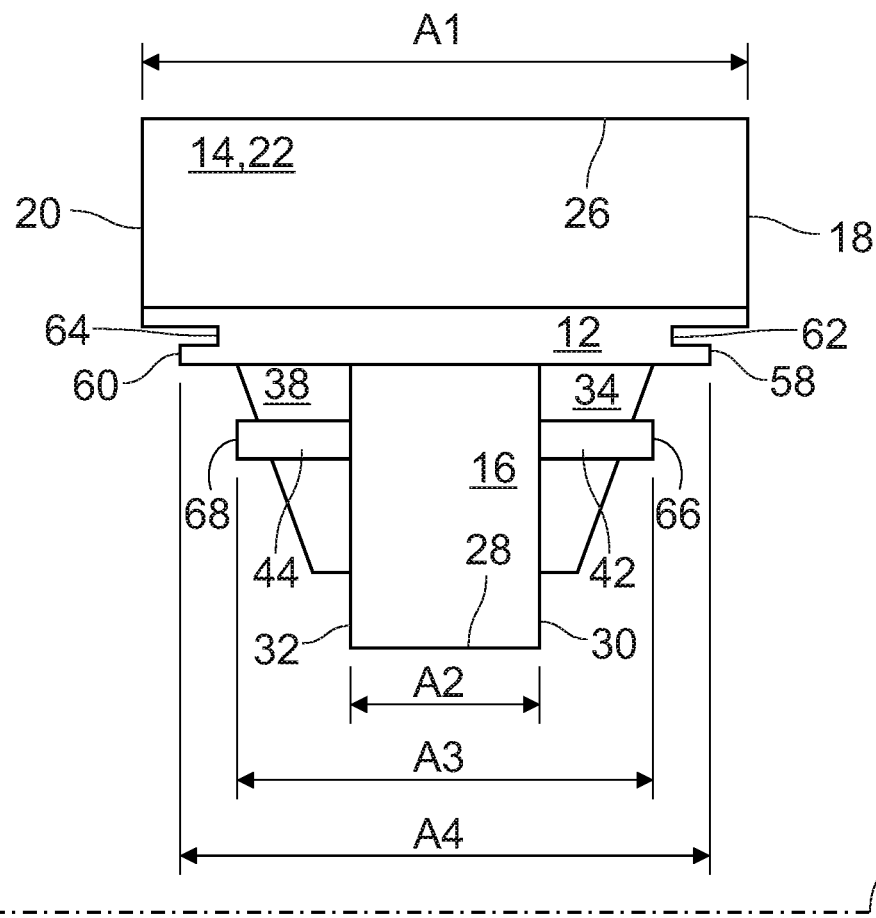

In FIGS. 5A to 5C, a fifth exemplary embodiment of the gear ring carrier part $10_5$ according to the invention is shown with the aid of various representations. The circular ring section 12 has a first circular ring section face 58 and a second circular ring section face 60. The first circular ring section face 58 is aligned in exactly the same way as the first gear ring face 18 and the second circular ring section face 60 is aligned in exactly the same way as the second gear ring face 20. A first circular ring section pocket 62 is arranged on the first circular ring section face 58 and a second circular ring section pocket 64 is arranged on the second circular ring section face. The first circular ring section pocket 62 and the second circular ring section pocket 64 are ring-shaped and have a constant diameter.

The first wall 42 has a first wall face 66 and the second wall 44 has a second wall face 68. The first wall face 66 and the second wall face 68 are arranged at a third distance A3 from one another. The first circular ring section face 58 and the second circular ring section face 60 are arranged at a fourth distance A4 from one another (see FIG. 5C). The following conditions apply: A1>A3, A4>A2.

In FIGS. 6A to 6C, a sixth exemplary embodiment of the gear ring carrier part $10_6$ according to the invention is shown with the aid of various representations. The gear ring carrier part $10_6$ according to the sixth exemplary embodiment is largely the same as the gear ring carrier part $10_5$ according to the fifth exemplary embodiment. However, the first circular ring section pocket 62 runs not only on the first circular ring section face 58, but also in sections in the first gear ring face 18 toward the tooth tips 26. Correspondingly, the second circular ring section pocket 64 runs in sections in the second gear ring face 20. As can be seen in particular from FIG. 6B, the first circular ring section pocket 62 and the second circular ring section pocket 64 have an undulating course.

Figure 7:
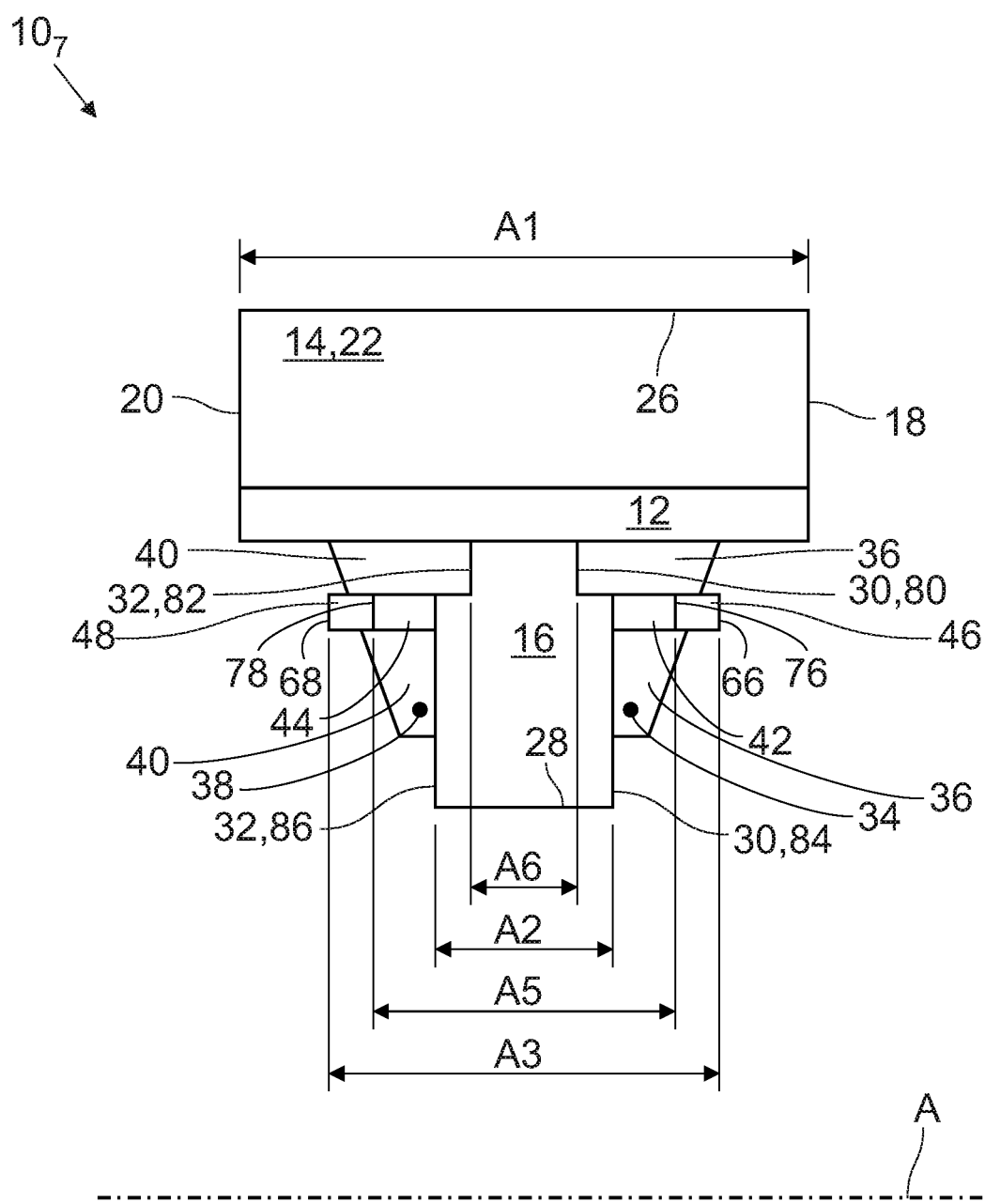
FIG. 7 shows a sectional illustration of a seventh exemplary embodiment of a gear ring carrier part according to the invention.

In FIG. 7, a seventh exemplary embodiment of the gear ring carrier part $10_7$ according to the invention is shown with the aid of a sectional representation analogous to the representations in FIGS. 1C, 5C and 6C. The seventh exemplary embodiment of the gear ring carrier part $10_7$ according to the invention is largely similar to the fourth exemplary embodiment of the gear ring carrier part $10_4$ according to the invention shown in FIGS. 4A to 4C, in particular the first wall 42 and the second wall 44 have the first recesses 46 and the second recesses 48, respectively. The first recesses 46 each have a first recess face 76 and the second recesses 48 each have a second recess face 78, which are arranged along the axis of rotation A at a fifth distance A5 from one another. The fifth distance A5 is greater than or equal to the second distance A2, at which the first extension face 30 and the second extension face 32 are arranged at a distance from one another, in other words, in mathematical terms, A5≥A2.

As mentioned, the walls 42, 44 subdivide the first pocket 36 and the second pocket 40 in the third, fourth, fifth and sixth exemplary embodiments of the gear ring carrier part $10_3$-$10_6$ into a radially outer section and a radially inner section. The walls 42, 44 rise from the first extension face 30 and from the second extension face 32, respectively, which are continuously arranged at a second distance A2 from one another.

In the seventh exemplary embodiment, the first extension face 30 and the second extension face 32, however, each have a generated offset. As a result, the first pocket 36 in the radially outer section has a first outer pocket base surface 80 and the second pocket 40 in the radially outer section has a second outer pocket base surface 82, which are arranged at a sixth distance A6 from one another relative to the axis of rotation A. Correspondingly, the first extension face 30 in the radially inner section has a radially inner first pocket base surface 84 and the second extension face 32 in the radially inner section as a radially inner second pocket base surface 86, which, however, are arranged further apart at a second distance A2 from one another. The above-mentioned offset of the first extension face 30 and the second extension face 32 lies in the first wall 42 and the second wall 44, respectively.

While in the third, fourth, fifth and sixth exemplary embodiments of the gear ring carrier part $10_3$-$10_6$, the distance A6 is equal to the distance A2, in the seventh exemplary embodiment of the gear ring carrier part $10_7$ according to the invention, the sixth distance A6 is smaller than the second distance A2.

In mathematical terms, the following relationship applies: A6≥A2.

The fifth distance A5, however, is greater than the second distance A2 or equal to the second distance A2, since otherwise the first pocket 36 and the second pocket 40 would not form a radially outer section. Expressed mathematically, A5≥A2 applies.

Figure 8:
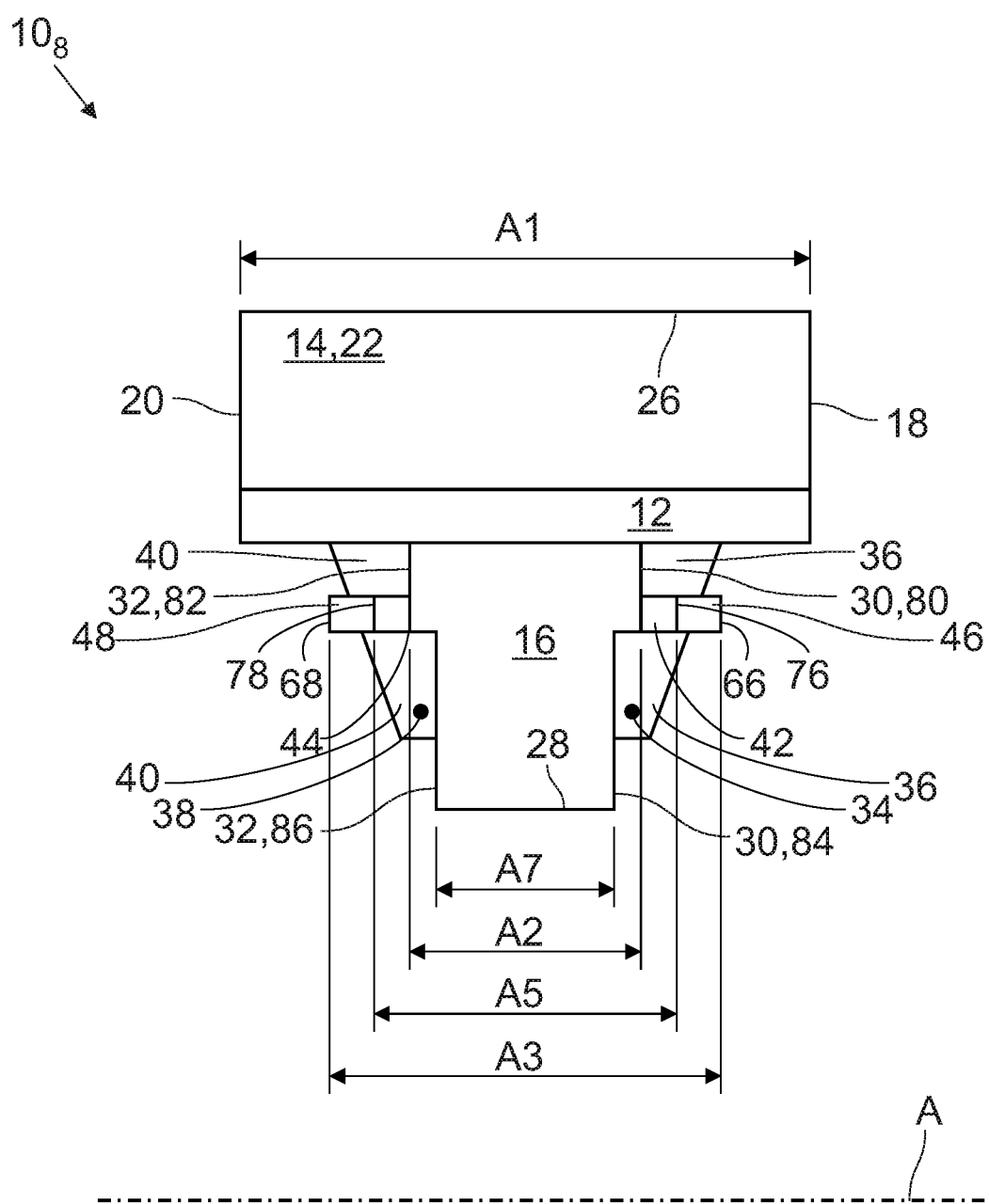
FIG. 8 shows a sectional illustration of an eighth exemplary embodiment of a gear ring carrier part according to the invention.

In FIG. 8, an eighth embodiment of the gear ring carrier part $10_8$ according to the invention is shown. In this exemplary embodiment, the first outer pocket base surface 80 and a second outer pocket base surface 82 are arranged at a second distance A2 from one another relative to the axis of rotation A, while the radially inner first pocket base surface 84 and the radially inner second pocket base surface 86 are arranged at a seventh distance A7. The seventh distance A7 is smaller than the second distance A2. In mathematical terms: A2≥A7, where A5≥A2, as in the seventh exemplary embodiment.

FIG. 9 shows a partial plan view of a ninth exemplary embodiment of the gear ring carrier part $10_9$ according to the invention. In the seventh exemplary embodiment of the gear ring carrier part $10_9$ according to the invention, the circular ring section 12 forms an undulating transition 74 to the first ribs 34 and the first pockets 36. The circular ring section 12 also forms an undulating transition (not shown) to the second ribs 38 and the second pockets 40.

With reference to the seven exemplary embodiments illustrated in FIGS. 1 to 8, it should be noted that the first ribs 34 and the second ribs 38 have flat or nearly flat surfaces. Viewed in the radial direction, they have a substantially rectangular cross section and therefore form edges. The first pockets 36 and the second pockets 40 are substantially flat. It can be seen from FIG. 9 that in the ninth exemplary embodiment $10_9$, the first ribs 34 and the second ribs 38, which cannot be seen here, have curved surfaces and therefore do not form any edges. The first pockets 36 and the second pockets, which cannot be seen in FIG. 9, are flat, but can be curved.

If one compares the first recess 46 of the first wall 42 of the ninth exemplary embodiment of the gear ring carrier part $10_9$ according to the invention shown in FIG. 9 with the first recess of the wall 42 shown in FIG. 4C, it can be seen that the recess 46 of the ninth exemplary embodiment has curved surfaces, while the recess 46 of the fourth embodiment comprises exclusively flat surfaces.

Figure 10:
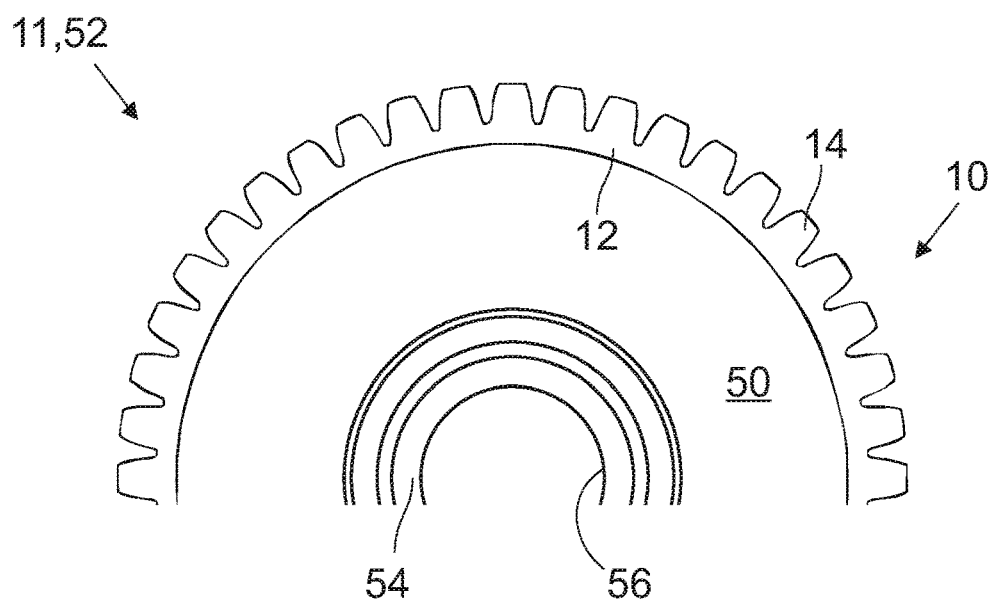
FIG. 10 is a side view of a multi-component gear according to the invention, which is designed as a spur gear.

In FIG. 10, a multi-component gear 11, in this case a three-component gear 11, which is designed as a spur gear 52, is shown with the aid of a side view. A design of the multi-component gear 11 as a helical gear or worm gear (not shown) is also conceivable. The three-component gear 11 comprises a gear ring carrier part 10 according to one of the exemplary embodiments discussed above, on the circular ring section 12 of which a gear ring 14 is arranged radially on the outside. In this case, a connecting part 50 is arranged radially inward from the gear ring carrier part 10 and connected to it in such a way that it encloses the extension 16. Furthermore, the three-component gear 11 comprises an insert part 54, which is arranged radially inward from the connecting part 50 and is connected to it. The insert part 54 forms a hub 56 with which the spur gear 52 can be connected to a shaft or the like, not shown here.

Due to the design of the gear ring carrier part 10 according to the invention, a flow path for the material that is liquid during injection results which leads to a significantly more uniform filling of the injection mold than is the case with gear ring carrier parts known, for example, from US 2014/007724 A1. Consequently, the formation of overflow channels is reduced and the homogeneity of the proposed gear ring carrier part is increased. The mechanical load-bearing capacity of the gear ring carrier part 10 according to the invention is increased compared to known gear ring carrier parts. The deformation of the gear ring carrier part 10 as a result of axially and/or radially acting forces is reduced, so that a detachment of the gear ring carrier part 10 from the connecting part 50 as a result of such deformations is counteracted. Such a detachment is also counteracted with the walls 42, 44 and the circular ring section pockets 62, 64, which provide a form fit acting in the radial direction.

Furthermore, the ribs 34, 38 and the pockets 36, 40 provide a form fit acting in the circumferential direction between the gear ring carrier part 10 and the connecting part 50, whereby the torque that can be transmitted between the gear ring carrier part 10 and the connecting part 50 can be increased.

LIST OF REFERENCE NUMERALS 10 gear ring carrier part
$10_1$ to $10_9$ gear ring carrier part
11 multi-component gear
12 circular ring section
14 gear ring
16 extension
18 first gear ring face
20 second gear ring face
22 teeth
24 tooth base
26 tooth tip
28 inner surface
30 first extension face
32 second extension face
34 first rib
36 first pocket
38 second rib
40 second pocket
42 first wall
44 second wall
46 first recess
48 second recess
50 connecting part
52 spur gear
54 insert part
56 hub
58 first circular ring section face
60 second circular ring section face
62 first circular ring section pocket
64 second circular ring section pocket
66 first wall face
68 second wall face
74 undulating transition
76 first recess face
78 second recess face
80 first outer pocket base surface
82 second outer pocket base surface
84 first inner pocket base surface
86 second inner pocket base surface
A axis of rotation
A1 first distance
A2 second distance
A3 third distance A4 fourth distance
A5 fifth distance
A6 sixth distance
A7 seventh distance
Df base diameter
Di inside diameter
Dk tip diameter

The invention claimed is:

1. A gear ring carrier part (10) for a two- or multi-component gear (11), wherein
the gear ring carrier part (10)
has a circular ring section (12) rotating in the circumferential direction about an axis of rotation (A),
a gear ring (14) arranged radially on the outside of the circular ring section (12), and
an extension (16) extending radially inward from the circular ring section (12),
the extension (16)
having a first extension face (30) and a second extension face (32),
a number of first ribs (34) and an equal number of first pockets (36) being arranged on the first extension face (30), and/or
a number of second ribs (38) and an equal number of second pockets (40) being arranged on the second extension face (32),
the first ribs (34) and the first pockets (36) and/or the second ribs (38) and the second pockets (40) each extending radially and being arranged adjacent to one another in the circumferential direction,
characterized in that
on the first extension face (30) at least one annular first wall (42) is arranged, which divides the first ribs (34) and the first pockets (36) into a radially inner section and a radially outer section in each case and/or
on the second extension face (32) at least one annular second wall (44) is arranged, which divides the second ribs (38) and the second pockets (40) into a radially inner section and a radially outer section in each case.

2. The gear ring carrier part (10) according to claim 1, characterized in that
the first ribs (34) and the first pockets (36) and/or the second ribs (38) and the second pockets (40) each form an undulating transition (74) with the circular ring section (12).

3. The gear ring carrier part (10) according to claim 1, characterized in that
a number of teeth (22) are arranged on the gear ring (14), which are equal to the number of first ribs (34) and second ribs (38) and the number of first pockets (36) and second pockets (40).

4. The gear ring carrier part (10) according to claim 3, characterized in that
each tooth of the gear ring (14) forms a corresponding tooth base (24) and a corresponding tooth tip (26) and
the first and second ribs (34, 38) are in alignment with the tooth bases (24) and the first and second pockets (36, 40) are in alignment with the tooth tips (26), or
the first and second ribs (34, 38) are in alignment with the tooth tips (26) and the first and second pockets (36, 40) are in alignment with the tooth bases (24).

5. The gear ring carrier part (10) according to claim 1, characterized in that
the first wall (42) has first recesses (46), which are arranged in alignment with the first pockets (36) and/or
the second wall (44) has second recesses (48), which are arranged in alignment with the second pockets (40).

6. The gear ring carrier part (10) according to claim 1, characterized in that
the gear ring (14) has a first gear ring face (18) and a second gear ring face (20) which are arranged at a first distance (A1) from one another, and
the first extension face (30) and the second extension face (32) are arranged at a second distance (A2) from one another,
the ratio of the first distance to the second distance being 1<A1/A2<10.

7. The gear ring carrier part (10) according to claim 5, characterized in that
the first recesses (46) have a first recess face (76) and
the second recesses (48) have a second recess face (78), wherein
the first recess face (76) and the second recess face (78) are spaced apart from one another by a fifth distance (A5), wherein
A5≥A2.

8. The gear ring carrier part (10) according claim 1, characterized in that
the first pockets (36) in the radially outer section have a first outer pocket base surface (80) and the second pockets (40) in the radially outer section have a second outer pocket base surface (82) which are arranged at a sixth distance (A6) from one another, wherein A2≥A6, or
the first pockets (36) in the inner outer section have a first inner pocket base surface (84) and the second pockets (40) in the radially inner section have a second inner pocket base surface (86) which are arranged at a seventh distance (A7) from one another, wherein A2≥A7.

9. The gear ring carrier part (10) according to claim 1, characterized in that
the gear ring (14) has a tip diameter (Dk) and a base diameter (Df) and
the extension (16) has an inner surface (28) that faces the axis of rotation (A) and has an inner surface diameter (Di),
wherein the ratio Df/Di is >1.

10. The gear ring carrier part (10) according to claim 1, characterized in that
the first wall (42) has a first wall face (66) and the second wall (44) has a second wall face (68) which are arranged at a third distance (A3) from one another,
the first circular ring section face (58) and the second circular ring section face (60) are arranged at a fourth distance (A4) from one another, wherein
A1>A3 and/or A4>A2.

11. A two- or multi-component gear (11), comprising
a gear ring carrier part (10) according claim 1, and
a connecting part (50) connected to the gear ring carrier part (10) in a form-fitting manner, wherein the connecting part (50)
encloses the extension (16) or
encloses the extension (16) and the circular ring section (12), or
encloses the extension (16) and the circular ring section (12) and the gear ring (14) in the area of the first circular ring section face (58) and the second circular ring section face (60) as well as the first circular ring section pocket (62) and the second circular ring section pocket (64).

12. The two- or multi-component gear (11) according to claim 11, characterized in that the two- or multi-component gear (11) is designed as a spur gear (52), a helical gear or a worm gear.

13. The two- or multi-component gear (11) according to claim 11, characterized in that
the two- or multi-component gear (11) comprises an insert part (54) which is connected to the connecting part (50) and is enclosed by the connecting part (50).

14. A gear ring carrier part (10) for a two- or multi-component gear (11), wherein
the gear ring carrier part (10)
has a circular ring section (12) rotating in the circumferential direction about an axis of rotation (A),
a gear ring (14) arranged radially on the outside of the circular ring section (12), and
an extension (16) extending radially inward from the circular ring section (12),
the extension (16)
having a first extension face (30) and a second extension face (32),
a number of first ribs (34) and an equal number of first pockets (36) being arranged on the first extension face (30), and/or
a number of second ribs (38) and an equal number of second pockets (40) being arranged on the second extension face (32),
the first ribs (34) and the first pockets (36) and/or the second ribs (38) and the second pockets (40) each extending radially and being arranged adjacent to one another in the circumferential direction,
characterized in that:
the circular ring section (12) has a first circular ring section face (58) and a second circular ring section face (60),
at least one first circular ring section pocket (62) is arranged on the first circular ring section face (58), and/or
at least one second circular ring section pocket (64) is arranged on the second circular ring section face (60).

15. The gear ring carrier part (10) according to claim 14, characterized in that the first circular ring section pocket (62) and/or the second circular ring section pocket (64) are ring-shaped and have a constant diameter or have an undulating course.

16. The gear ring carrier part (10) according to claim 14, characterized in that
the first circular ring section pocket (62) has an undulating course and runs at least in sections in the first gear ring face (18) and/or
the second circular ring section pocket (64) has an undulating course and runs at least in sections in the second gear ring face (20).

17. A gear ring carrier part (10) for a two- or multi-component gear (11), wherein
the gear ring carrier part (10)
has a circular ring section (12) rotating in the circumferential direction about an axis of rotation (A),
a gear ring (14) arranged radially on the outside of the circular ring section (12), and
an extension (16) extending radially inward from the circular ring section (12),
the extension (16)
having a first extension face (30) and a second extension face (32),
a number of first ribs (34) and an equal number of first pockets (36) being arranged on the first extension face (30), and/or
a number of second ribs (38) and an equal number of second pockets (40) being arranged on the second extension face (32),
the first ribs (34) and the first pockets (36) and/or the second ribs (38) and the second pockets (40) each forming an undulating transition (74) with the circular ring section (12), and
the first ribs (34) and the first pockets (36) and/or the second ribs (38) and the second pockets (40) each extending radially and being arranged adjacent to one another in the circumferential direction,
characterized in that
the gear ring (14) has a first gear ring face (18) and a second gear ring face (20) which are arranged at a first distance (A1) from one another,
the first extension face (30) and the second extension face (32) are arranged at a second distance (A2) from one another, and
the ratio of the first distance to the second distance being $2 < A1/A2 < 5$.

* * * * *